US012681263B2

(12) United States Patent
Yuri

(10) Patent No.: US 12,681,263 B2
(45) Date of Patent: Jul. 14, 2026

(54) OPTICAL DEVICE AND IMAGE PICKUP APPARATUS

(71) Applicant: CANON KABUSHIKI KAISHA, Tokyo (JP)

(72) Inventor: Takeru Yuri, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 263 days.

(21) Appl. No.: 18/504,623

(22) Filed: Nov. 8, 2023

(65) Prior Publication Data

US 2024/0159987 A1 May 16, 2024

(30) Foreign Application Priority Data

Nov. 14, 2022 (JP) ................................. 2022-181633

(51) Int. Cl.
*G02B 7/09* (2021.01)
(52) U.S. Cl.
CPC ..................................... *G02B 7/09* (2013.01)
(58) Field of Classification Search
CPC ....................................................... G02B 7/09
USPC ....................................................... 359/738
See application file for complete search history.

(56) References Cited

U.S. PATENT DOCUMENTS

2003/0160949 A1* 8/2003 Komatsuda ......... G03F 7/70183
355/71
2013/0258499 A1* 10/2013 Hashimoto .............. G02B 9/60
359/714
2013/0329307 A1* 12/2013 Jung ...................... G02B 13/18
359/764
2014/0071334 A1* 3/2014 Nakagawa ......... G02B 13/0045
359/764

FOREIGN PATENT DOCUMENTS

JP          H1184209 A      3/1999
JP          2012230433 A    11/2012
JP          2020101606 A    7/2020
JP          2021144139 A    9/2021

* cited by examiner

*Primary Examiner* — Sharrief I Broome
(74) *Attorney, Agent, or Firm* — ROSSI, KIMMS & McDOWELL LLP

(57) ABSTRACT

An optical device can include four lens units and four drive units. The four drive units are configured to move respective lens units of the four lens units. The four lens units each move in a direction along an optical axis. The optical device also includes a stop member that has a variable aperture diameter and is driven by a fifth drive unit. Further, each of the first to fifth drive units is an actuator. One of the drive units is arranged closer to an image than is the stop member that has the longest length in the direction along the optical axis. The one of the drive units and the fifth drive unit are arranged in different ones of four equally divided spaces around the optical axis.

15 Claims, 6 Drawing Sheets

OPTICAL DEVICE AND IMAGE PICKUP APPARATUS

BACKGROUND OF THE INVENTION

Field of the Invention

The present disclosure relates to an optical device and an image pickup apparatus.

Description of the Related Art

A lens barrel, which is used for an optical apparatus such as a video camera, includes a movable frame for holding lenses. When the movable frame is driven by an actuator in a direction along an optical axis, magnification varying (zooming) or focus adjustment (focusing) is performed. Further, when a plurality of blades of an aperture stop unit are driven by an actuator, a light amount is adjusted.

In Japanese Patent Application Laid-Open No. 2020-101606, there is disclosed a lens barrel including a plurality of actuators. The plurality of actuators include three actuators for driving three lens-unit movable frames, respectively, an actuator for driving a stop, and an actuator for driving an image stabilizing lens.

In the lens barrel disclosed in Japanese Patent Application Laid-Open No. 2020-101606, a stop unit and a fourth-lens-unit drive motor are arranged in series along an optical axis. Here, the fourth-lens-unit drive motor has the longest length in a direction along the optical axis among the actuators that are closer to an image than the stop unit. Thus, the arrangement of the fourth-lens-unit drive motor in series to the stop unit disadvantageously increases a size of the lens barrel in the direction along the optical axis.

SUMMARY OF THE INVENTION

The present disclosure has an object to provide an optical device having advantages such as a small size.

In order to achieve the above-mentioned object, according to the present disclosure, there is provided an optical device including: first to fourth lens units; first to fourth drive units configured to move the first to fourth lens units in a direction along an optical axis, respectively; a stop member having a variable aperture diameter; and a fifth drive unit configured to change the aperture diameter, wherein one of drive units arranged closer to an image than the stop member among the first to fourth drive units, which has the longest length in the direction along the optical axis, and the fifth drive unit are arranged in different ones of four equally divided spaces around the optical axis.

Further features of the present invention will become apparent from the following description of exemplary embodiments with reference to the attached drawings.

DESCRIPTION OF THE EMBODIMENTS

Figure 1:
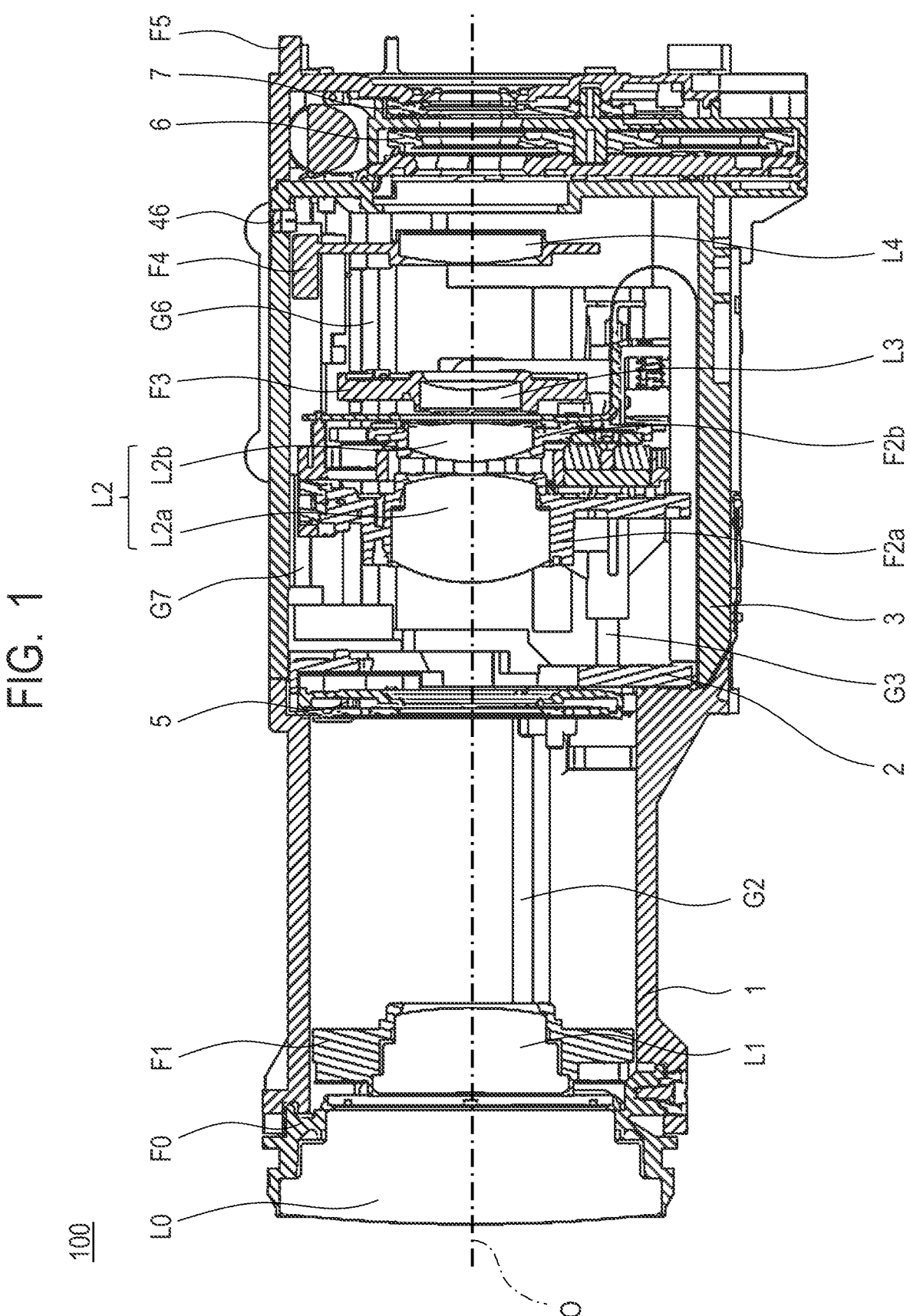
FIG. 1 is a sectional view of a lens device according to an embodiment.

Preferred embodiments of the present invention will now be described in detail in accordance with the accompanying drawings. FIG. 1 is a sectional view of a lens device 100 (optical device) according to an embodiment of the present disclosure. A direction in which an optical axis O extends is referred to as an optical axis direction, a fixed lens unit L0 side, which is described later, is referred to as an object side, and a second fixed holding frame F5 side, which is described later, is referred to as an image plane side. A photographing light flux from the object side passes through a plurality of lens units (optical elements) described later to form an image on an image pickup unit (not shown).

The lens device 100 includes a front fixed lens barrel 1, an intermediate fixed lens barrel 2, a rear fixed lens barrel 3, a first fixed holding frame F0, and the second fixed holding frame F5. The above-mentioned lens barrels and frames form a casing. A plurality of lens units, a plurality of actuators, adjustment members, and an adjustment-member drive unit described later are arranged inside the casing. The plurality of actuators drive the plurality of lens units in a direction along the optical axis O, respectively. The adjustment members adjust light. The adjustment-member drive unit drives the adjustment members. The plurality of lens units form a variable magnification optical system (zoom lens system) including four movable lens units, each including at least one optical element. The plurality of actuators include four actuators that drive the four lens units, respectively. An infrared unit (IR unit) 7, a polarizing filter, a wavelength selective filter, a soft focus filter, or the like is provided as the adjustment member that adjusts light. Further, a stop unit 5 (variable stop or stop member) serving as an aperture stop having a variable aperture diameter and a neutral density unit (ND unit or filter) 6 are provided as adjustment members that adjust a light amount.

The fixed lens unit L0 includes at least one optical element. The fixed lens unit L0 is fixed to the first fixed holding frame F0 and thus is unmovable in the optical axis direction. The plurality of lens units include a first movable lens unit L1, a second movable lens unit L2, a third movable lens unit L3, and a fourth movable lens unit L4. When the first movable lens unit L1, the second movable lens unit L2, and the fourth movable lens unit L4 are moved in the optical axis direction, the optical system can perform a magnification varying action. The first to fourth movable lens units L1 to L4 are arranged in the stated order from the object side to the image side.

The second movable lens unit L2 includes a 2a lens unit L2a and a 2b lens unit L2b. The second movable lens unit L2 is a unit that enables not only a magnification varying action but also an image blur correction action for the optical system. The 2b lens unit L2b is an image stabilizing unit that is shifted in a direction orthogonal to the optical axis O of a photographing optical system so as to reduce image blur. When the third movable lens unit L3 is moved in the optical axis direction, the third movable lens unit L3 can correct a shift of the image plane caused along with magnification varying and perform a focus adjustment action.

The first fixed holding frame F0 holds the fixed lens unit L0. A first movable holding frame F1 holds the first movable lens unit L1 movably in the optical axis direction. A second movable holding frame F2a holds the 2a lens unit L2a movably in the optical axis direction. An image stabilization movable frame F2b holds the 2b lens unit L2b. The image stabilization movable frame F2b is mounted so as to be movable in a direction orthogonal to the optical axis direction with respect to the second movable holding frame F2a. A third movable holding frame F3 holds the third movable lens unit L3 movably in the optical axis direction. A fourth movable holding frame F4 holds the fourth movable lens unit L4 movably in the optical axis direction.

The front fixed lens barrel 1 holds the first fixed holding frame F0 at a front end (object side) of the front fixed lens barrel 1 and fixes the fixed lens unit L0 at a predetermined position through intermediation of the first fixed holding frame F0. Further, a rear end (image plane side) of the front fixed lens barrel 1 is coupled to the rear fixed lens barrel 3.

The intermediate fixed lens barrel 2 holds the stop unit 5 that adjusts a light amount passing through a plurality of lenses. A rear end of the intermediate fixed lens barrel 2 is coupled to the rear fixed lens barrel 3. Aperture blades of the stop unit 5 are moved in a plane orthogonal to the optical axis O by the adjustment-member drive unit to change an aperture diameter of the optical system to thereby adjust the light amount.

The rear fixed lens barrel 3 has a front end that is fixed to the front fixed lens barrel 1 and the intermediate fixed lens barrel 2 and a rear end that is coupled to the second fixed holding frame F5. Further, the rear fixed lens barrel 3 holds lens-unit drive units described later.

The second fixed holding frame F5 has a front end that is fixed to the rear fixed lens barrel 3. The second fixed holding frame F5 encloses the ND unit 6, the IR unit 7, and an image pickup element (not shown).

When the light amount is adjusted only by changing an area of a stop aperture with use of the stop unit 5, the stop aperture may become too small at the time of photographing a high-brightness object. As a result, optical performance may degrade due to a light diffraction phenomenon. In order to prevent the degradation of the optical performance, the light amount is reduced by using a filter of the ND unit 6. The IR unit 7 has the following mechanism including an infrared cut filter that cuts near-infrared light. Specifically, when the lens device 100 is used in a visible light range, the infrared cut filter is arranged in front of the image pickup element in the optical axis direction. When the lens device 100 is used in a near-infrared range, the infrared cut filter is removed.

Figure 2:
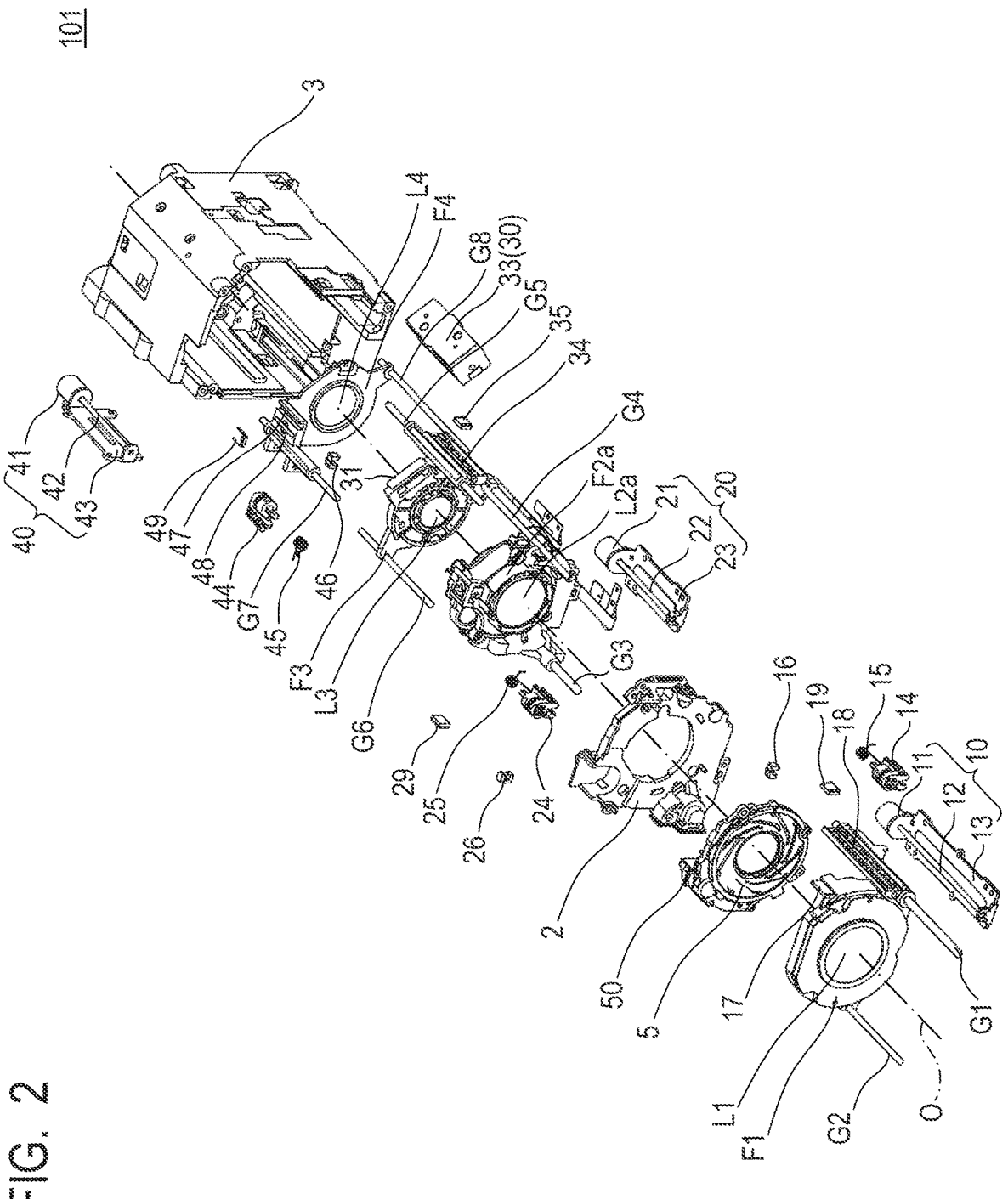
FIG. 2 is an exploded perspective view of a drive unit in the embodiment (when viewed from an object side).
Figure 3:
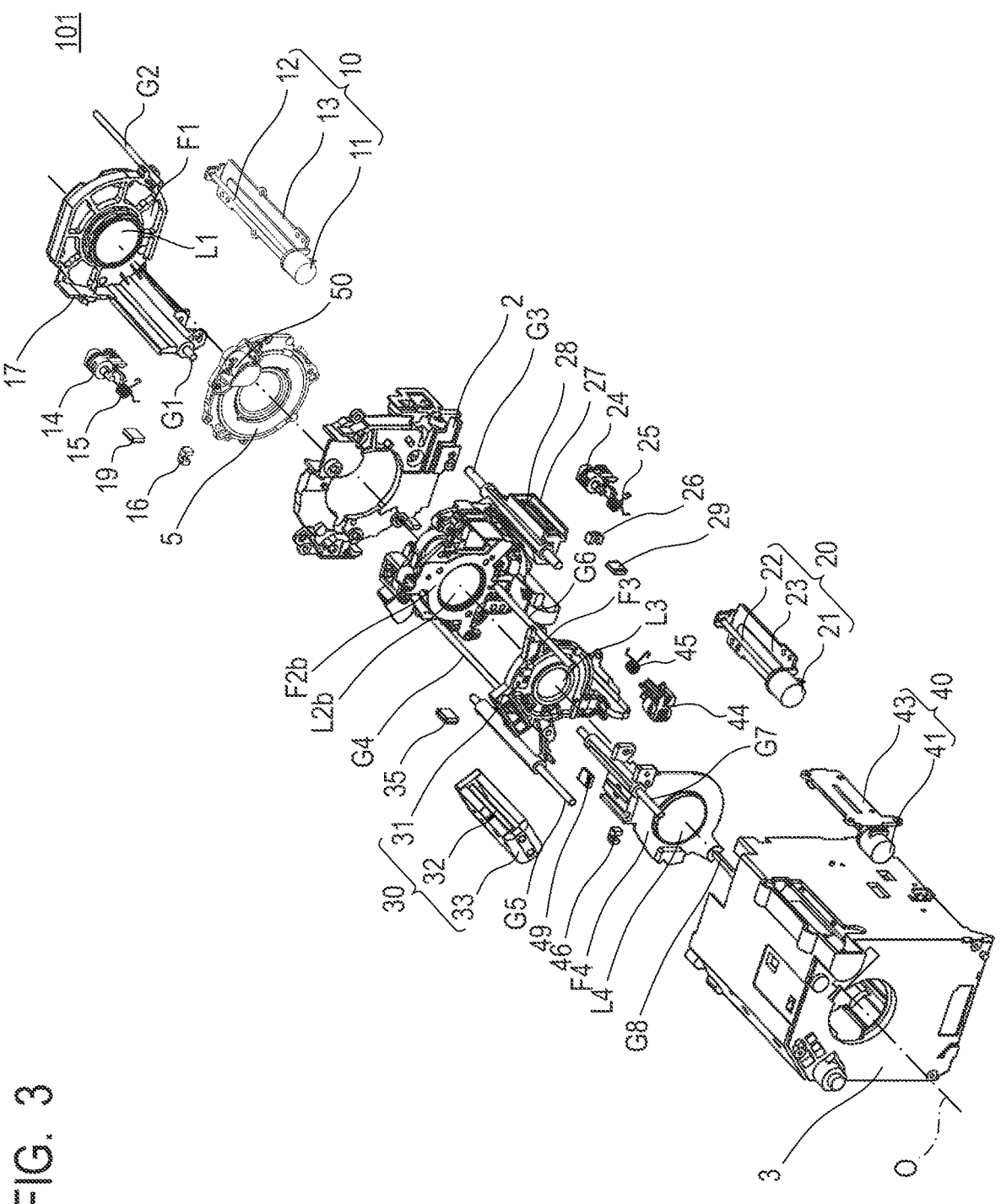
FIG. 3 is an exploded perspective view of the drive unit in the embodiment (when viewed from an image plane side).

Now, components of a drive unit 101 in the embodiment are described with reference to FIG. 2 and FIG. 3. FIG. 2 is an exploded perspective view of the drive unit 101 in the embodiment when viewed from the object side. FIG. 3 is an exploded perspective view of the drive unit 101 in the embodiment when viewed from the image plane side.

A first guide bar G1 has two ends that are held by the front fixed lens barrel 1 (not shown) and the rear fixed lens barrel 3, respectively. A second guide bar G2 has two ends that are held by the front fixed lens barrel 1 and the intermediate fixed lens barrel 2, respectively. The first movable holding frame F1 is supported by the first guide bar G1 and the second guide bar G2 so as to be movable in the optical axis direction.

Each of a third guide bar G3 and a fourth guide bar G4 has two ends that are held by the intermediate fixed lens barrel 2 and the rear fixed lens barrel 3, respectively. The second movable holding frame F2a is supported by the third guide bar G3 and the fourth guide bar G4 so as to be movable in the optical axis direction.

Each of a fifth guide bar G5 and a sixth guide bar G6 has two ends that are held by the intermediate fixed lens barrel 2 and the rear fixed lens barrel 3, respectively. The third movable holding frame F3 is supported by the fifth guide bar G5 and the sixth guide bar G6 so as to be movable in the optical axis direction.

Each of a seventh guide bar G7 and an eighth guide bar G8 has two ends that are held by the intermediate fixed lens barrel 2 and the rear fixed lens barrel 3, respectively. The fourth movable holding frame F4 is supported by the seventh guide bar G7 and the eighth guide bar G8 so as to be movable in the optical axis direction.

Next, a configuration of a first actuator 10 (lens-unit drive unit or first drive unit) configured to move the first movable holding frame F1 is described. The first actuator 10 is a stepping motor. When a motor unit 11 is driven, the first actuator 10 drives the first movable holding frame F1 in the optical axis direction. A lead screw 12 is formed on an output shaft of the motor unit 11.

The motor unit 11 is fixed to the rear fixed lens barrel 3 through intermediation of a support member 13. A rack 14 is mounted to the first movable holding frame F1 and is meshed with the lead screw 12. When the motor unit 11 is energized to rotate the lead screw 12, the first movable holding frame F1 is driven in the optical axis direction through intermediation of the rack 14.

Backlash of the rack 14 and the first movable holding frame F1 in the optical axis direction is reduced by a biasing force of a torsion coil spring 15. Under a state in which the motor unit 11 is not energized (non-energized state), the first movable holding frame F1 has a self-holding force because the rack 14 and the lead screw 12 are meshed with each other.

A reset switch 16 is a zoom reset switch for detecting the first movable holding frame F1 when the first movable holding frame F1 is in a reference position. The reset switch 16 is a photo interrupter that detects switching between a light-shielding state and a light-transmitting state, which is caused by movement of a light shielding portion 17 of the first movable holding frame F1 in the optical axis direction. The reset switch 16 is fixed to the front fixed lens barrel 1 through intermediation of a board (not shown).

A scale 18 is a reflective film scale that forms an optical position detecting encoder. The scale 18 is held on the first movable holding frame F1. A sensor head 19 is a photo IC chip including a light source and a circuit that are built therein. The light source includes an LED chip. The circuit performs signal processing on light from the light source that has been reflected by the scale 18. The sensor head 19 is fixed at a position on the rear fixed lens barrel 3 through intermediation of a board (not shown) so as to be opposed to the scale 18. The amount of movement of the first movable holding frame F1 from a predetermined reference position (the reset switch 16) can be detected by using a signal from the sensor head 19.

Next, a configuration of a second actuator 20 (lens-unit drive unit having the longest length or second drive unit) configured to move the second movable holding frame F2a is described. A basic configuration of the second actuator 20 is similar to that of the first actuator 10. The second actuator 20 is a stepping motor. When a motor unit 21 is driven, the second actuator 20 drives the second movable holding frame F2a in the optical axis direction. A lead screw 22 is formed on an output shaft of the motor unit 21.

The motor unit 21 is fixed to the rear fixed lens barrel 3 through intermediation of a support member 23. A rack 24 is mounted to the second movable holding frame F2*a* and is meshed with the lead screw 22. Thus, when the motor unit 21 is energized to rotate the lead screw 22, the second movable holding frame F2*a* is driven in the optical axis direction through intermediation of the rack 24.

Backlash of the rack 24 and the second movable holding frame F2*a* in the optical axis direction is reduced by a biasing force of a torsion coil spring 25. Under a state in which the motor unit 21 is not energized (non-energized state), the second movable holding frame F2*a* has a self-holding force because the rack 24 and the lead screw 22 are meshed with each other.

A reset switch 26 is a zoom reset switch for detecting the second movable holding frame F2*a* when the second movable holding frame F2*a* is in a reference position. The reset switch 26 is a photo interrupter that detects switching between a light-shielding state and a light-transmitting state, which is caused by movement of a light shielding portion 27 of the second movable holding frame F2*a* in the optical axis direction. The reset switch 26 is fixed to the rear fixed lens barrel 3 through intermediation of a board (not shown).

A scale 28 is a reflective film scale that forms an optical position detecting encoder. The scale 28 is held on the second movable holding frame F2*a*. A sensor head 29 is a photo IC chip including a light source and a circuit that are built therein. The light source includes an LED chip. The circuit performs signal processing on light from the light source that has been reflected by the scale 28. The sensor head 29 is fixed at a position on the rear fixed lens barrel 3 through intermediation of a board (not shown) so as to be opposed to the scale 28. The amount of movement of the second movable holding frame F2*a* from a predetermined reference position (the reset switch 26) can be detected by using a signal from the sensor head 29.

Next, a configuration of a third actuator 30 (lens-unit drive unit or third drive unit) configured to move the third movable holding frame F3 is described. The third actuator 30 is a voice coil motor. The third actuator 30 includes a drive coil 31, a drive magnet 32, and a yoke member 33 for closing magnetic flux.

The drive coil 31 is mounted to the third movable holding frame F3. The drive magnet 32 is provided inside the yoke member 33. The yoke member 33 is mounted to the rear fixed lens barrel 3.

When the drive coil 31 is energized, Lorentz force is generated between the drive magnet 32 and the drive coil 31 due to repelling magnetic lines of force. The third movable holding frame F3 is driven in the optical axis direction by the thus generated Lorentz force. Under a state in which the drive coil 31 is not energized (non-energized state), no driving force for the third movable holding frame F3 is generated. Further, the third movable holding frame F3 does not have a self-holding force.

A scale 34 is a reflective film scale that forms an optical position detecting encoder. The scale 34 is held on the third movable holding frame F3. A sensor head 35 is a photo IC chip including a light source and a circuit that are built therein. The light source includes an LED chip. The circuit performs signal processing on light from the light source that has been reflected by the scale 34. The sensor head 35 is fixed at a position on the rear fixed lens barrel 3 through intermediation of a board (not shown) so as to be opposed to the scale 34. The amount of movement of the third movable holding frame F3 from a predetermined reference position can be detected by using a signal from the sensor head 35.

Next, a configuration of a fourth actuator 40 (lens-unit drive unit or fourth drive unit) configured to move the fourth movable holding frame F4 is described. A basic configuration of the fourth actuator 40 is similar to that of the first actuator 10. The fourth actuator 40 is a stepping motor. When a motor unit 41 is driven, the fourth actuator 40 drives the fourth movable holding frame F4 in the optical axis direction. A lead screw 42 is formed on an output shaft of the motor unit 41.

The motor unit 41 is fixed to the rear fixed lens barrel 3 through intermediation of a support member 43. A rack 44 is mounted to the fourth movable holding frame F4 and is meshed with the lead screw 42. Thus, when the motor unit 41 is energized to rotate the lead screw 42, the fourth movable holding frame F4 is driven in the optical axis direction through intermediation of the rack 44.

Backlash of the rack 44 and the fourth movable holding frame F4 in the optical axis direction is reduced by a biasing force of a torsion coil spring 45. Under a state in which the motor unit 41 is not energized (non-energized state), the fourth movable holding frame F4 has a self-holding force because the rack 44 and the lead screw 42 are meshed with each other.

A reset switch 46 is a zoom reset switch for detecting the fourth movable holding frame F4 when the fourth movable holding frame F4 is in a reference position. The reset switch 46 is a photo interrupter that detects switching between a light-shielding state and a light-transmitting state, which is caused by movement of a light shielding portion 47 of the fourth movable holding frame F4 in the optical axis direction. The reset switch 46 is fixed to the rear fixed lens barrel 3 through intermediation of a board (not shown).

A scale 48 is a reflective film scale that forms an optical position detecting encoder. The scale 48 is held on the fourth movable holding frame F4. A sensor head 49 is a photo IC chip including a light source and a circuit that are built therein. The light source includes an LED chip. The circuit performs signal processing on light from the light source that has been reflected by the scale 48. The sensor head 49 is fixed at a position on the rear fixed lens barrel 3 through intermediation of a board (not shown) so as to be opposed to the scale 48. The amount of movement of the third movable holding frame F3 from a predetermined reference position (the reset switch 46) can be detected by using a signal from the sensor head 49.

Next, a configuration of the stop unit 5 is described. The stop unit 5 is driven by a fifth actuator 50 (adjustment-member drive unit or fifth drive unit). The fifth actuator 50 is a stepping motor or a DC motor. The stop unit 5 includes a plurality of aperture blades (not shown) and a plurality of components. The plurality of components are coupled between the aperture blades and the fifth actuator 50. When the fifth actuator 50 is driven, the plurality of aperture blades are moved inward and outward in a radial direction to thereby adjust a light amount.

Figure 4:
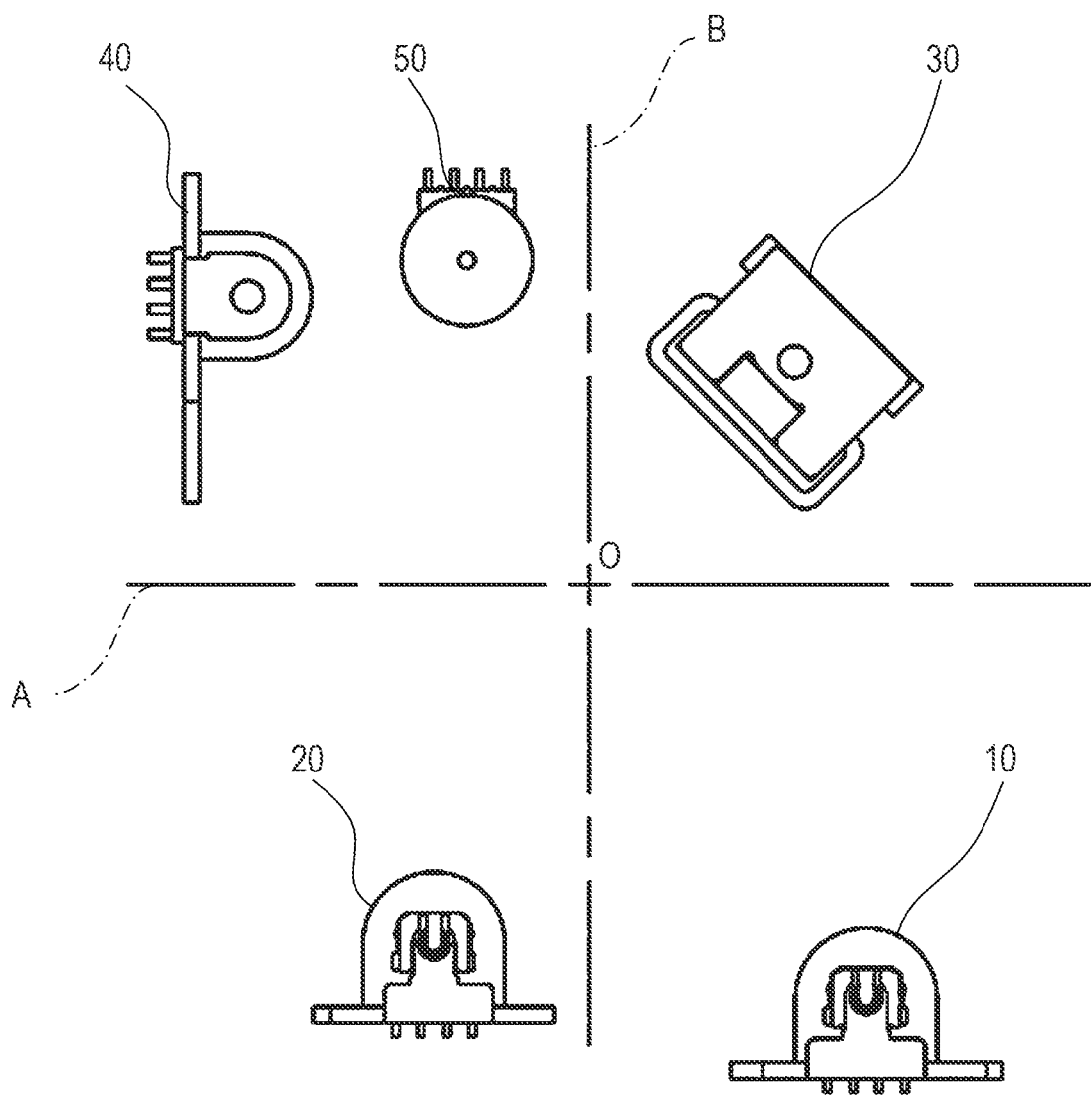
FIG. 4 is a view for illustrating an arrangement of actuators in the embodiment when viewed from the object side.
Figure 5:
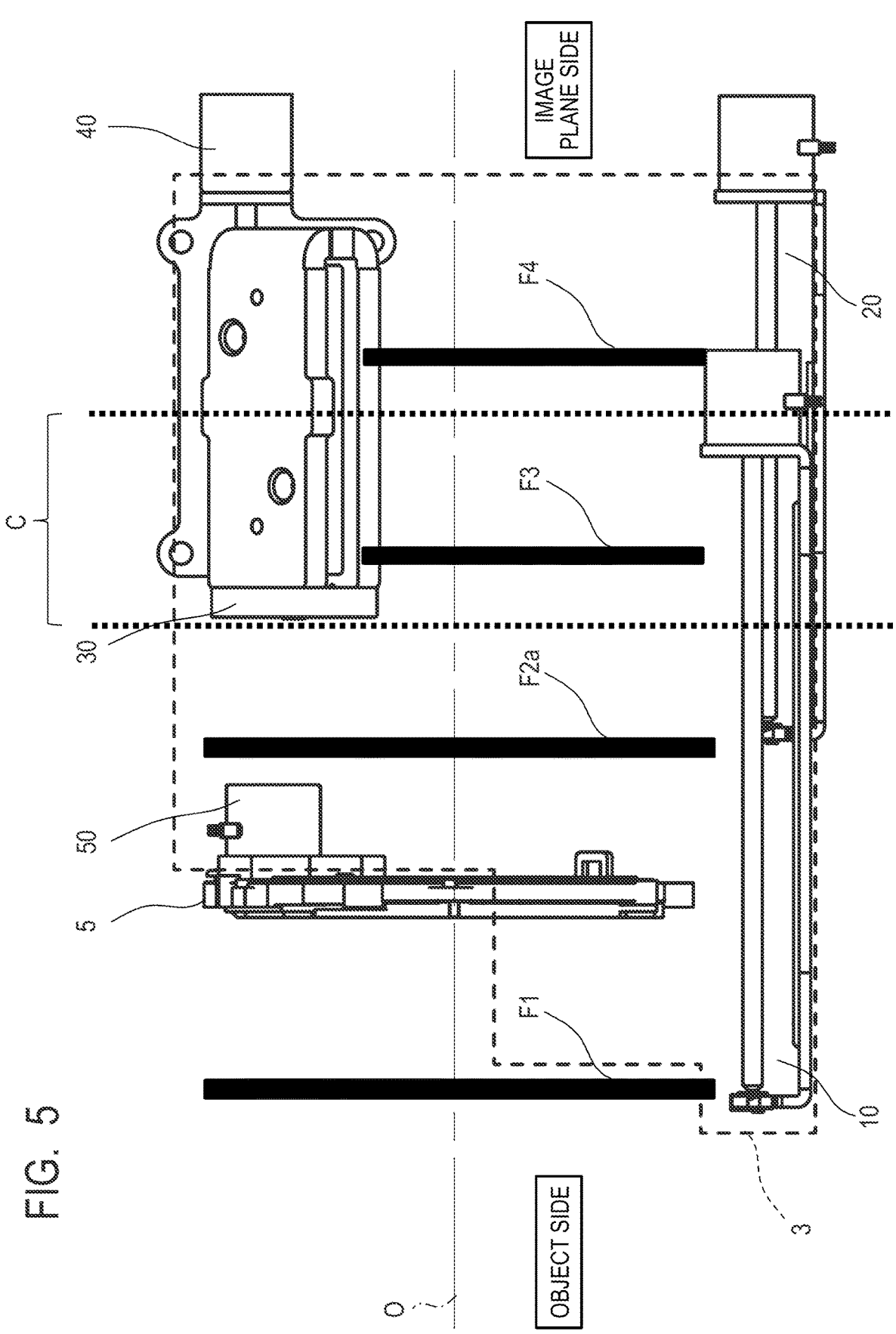
FIG. 5 is a view for illustrating an arrangement of the actuators in the embodiment in a direction along an optical axis.

Now, an arrangement of the actuators in the embodiment is described in detail with reference to FIG. 4 and FIG. 5. FIG. 4 is a view for illustrating a positional relationship among the actuators in the embodiment when viewed from the object side. FIG. 5 is a view for illustrating a positional relationship among the actuators in the embodiment when viewed in a direction perpendicular to a vertical plane B of FIG. 4.

As illustrated in FIG. 4, when an internal space of the lens device 100 is divided by a horizontal plane A containing the optical axis O and the vertical plane B containing the optical axis O and being orthogonal to the horizontal plane A, the lens device 100 is divided into four spaces. The actuators that drive the first to fourth movable holding frames F1 to F4, which are four movable members, are arranged so that one actuator is located in each of the spaces. In particular, the third actuator 30 is a voice coil motor and includes a magnet having a strong magnetic force. Thus, in order to prevent magnetic interference with other actuators, it is preferred that the third actuator 30 be arranged as far as possible from other actuators. Meanwhile, the fifth actuator 50 for the stop unit 5 is arranged in the space in which one of the first to fourth actuators 10 to 40 is arranged. In the embodiment, the fifth actuator 50 is arranged in the space in which the fourth actuator 40 is arranged. Further, the fifth actuator 50 is arranged closer to the optical axis O than the fourth actuator 40. Further, when the lens device 100 is in a normal position, the fifth actuator 50 is arranged in an upper left one of the spaces. In FIG. 4, there is exemplified a case in which four actuators other than the fifth actuator 50 are provided. However, the number of actuators other than the fifth actuator 50 may be three or five or more. Further, in the embodiment, each of the first actuator 10, the second actuator 20, and the fourth actuator 40 is a stepping motor, and the third actuator 30 is a voice coil motor. However, the plurality of actuators may be such that at least one actuator includes a stepping motor and at least another one of the plurality of actuators includes a voice coil motor.

As described above, the first actuator 10 drives the first movable holding frame F1 in the optical axis direction. As illustrated in FIG. 5, the first movable holding frame F1 is arranged closer to the object than the stop unit 5. Similarly, the second actuator 20 drives the second movable holding frame F2_a_ in the optical axis direction. The second movable holding frame F2_a_ is arranged closer to the image plane than the stop unit 5. Besides, the third actuator 30 and the fourth actuator 40 are also arranged closer to the image plane than the stop unit 5.

When the internal space of the lens device 100 is divided into four spaces by the planes each containing the optical axis O and being orthogonal to each other, the fifth actuator 50 is required to be arranged (in series) in the space in which any one of the first to fourth actuators is arranged. Thus, the device may be disadvantageously increased in size depending on the actuator with which the fifth actuator 50 is arranged in the same space.

The first actuator 10 is an actuator that has the longest length in the optical axis direction among the actuators. Thus, when, for example, the fifth actuator 50 and the first actuator 10 are arranged in the same space, the device is increased in size, in particular, to the object side. The size of the device is also increased when the fifth actuator 50 and the second actuator 20 are arranged in the same space. The second actuator 20 has the longest length in the optical axis direction and moves over the largest distance among the actuators that are arranged closer to the image plane than the stop unit 5. Thus, the device is increased in size, in particular, to the image plane side.

Accordingly, the fifth actuator 50 and the second actuator 20, which has the longest length in the direction along the optical axis O among the plurality of actuators that are arranged closer to the image plane (image) than the stop unit 5, are arranged in different ones of the four equally divided spaces around the optical axis O. Further, the fourth actuator 40 has the second longest length in the optical axis direction among the actuators that are arranged closer to the image plane than the stop unit 5. Thus, when the fifth actuator 50 and the fourth actuator 40 are arranged in the same space, an increase in the size of the device to the image plane side can be suppressed as compared with a case in which the fifth actuator 50 and the second actuator 20 are arranged in the same space.

Further, the fifth actuator 50 and the first actuator 10, which is one of the plurality of actuators arranged closer to the object than the stop unit 5 in the optical axis direction, are not arranged in the same space. In other words, the fifth actuator 50 and the first actuator 10 are arranged in parallel and are arranged so as to be diagonally opposed to each other inside the rear fixed lens barrel 3 having a substantially rectangular sectional shape when viewed in the optical axis direction. Such an arrangement allows efficient use of four corners of an internal space of the rear fixed lens barrel 3 having a substantially rectangular sectional shape. Thus, an increase in the size of the device in a radial direction can be suppressed.

Further, the plurality of (four) actuators are arranged in different four equally divided spaces around the optical axis O, respectively. Two of the plurality of actuators are arranged so as to overlap each other in the direction along the optical axis O when viewed from the direction perpendicular to the vertical plane B. As illustrated in FIG. 5, the plurality of actuators are arranged so as to overlap in the direction along the optical axis O in an area C when viewed from the direction perpendicular to the vertical plane B. In other words, the plurality of actuators are arranged substantially in parallel to the optical axis O and all in parallel to each other. Such an arrangement allows efficient use of the internal space of the rear fixed lens barrel 3. Thus, an increase in the size of the device in the optical axis direction can be suppressed. Thus, according to the embodiment, the optical device having a reduced size can be provided.

In the embodiment, the second actuator 20 has the longest length in the optical axis direction among the actuators that are located closer to the image plane than the stop unit 5. When one of the actuators other than the second actuator 20 has the longest length, it is only required that the longest actuator not be arranged in the space in which the fifth actuator 50 is arranged.

Further, in the embodiment, the internal space of the lens device 100 is divided by the horizontal plane A containing the optical axis O and the vertical plane B containing the optical axis O and being orthogonal to the horizontal plane A. Meanwhile, the rear fixed lens barrel 3 with a substantially rectangular cross section perpendicular to the optical axis O has a bottom surface, an upper surface, and two side surfaces. The bottom surface and the upper surface are opposed to each other, and the two side surfaces are opposed to each other. The four equally divided spaces around the optical axis O may also be obtained by dividing the internal space of the lens device 100 by a first plane and a second plane. The first plane contains the optical axis O and is orthogonal to the bottom surface. The second plane contains the optical axis O and is orthogonal to the first plane. In this manner, the internal space of the lens device 100 can be defined into four spaces. When the internal space of the lens device 100 is divided into four spaces, at least one of the plurality of actuators is arranged in each of the spaces. A predetermined distance can be substantially ensured between the actuators by equally dividing the internal space into four spaces. Thus, such an arrangement is effective when an actuator that may cause magnetic interference is used. Further, in the embodiment, four movable lens units are used. However, even when a larger number of movable lens units are used, the same effects are expected by setting the number of spaces in accordance with the number of movable units.

Application Example

Figure 6:
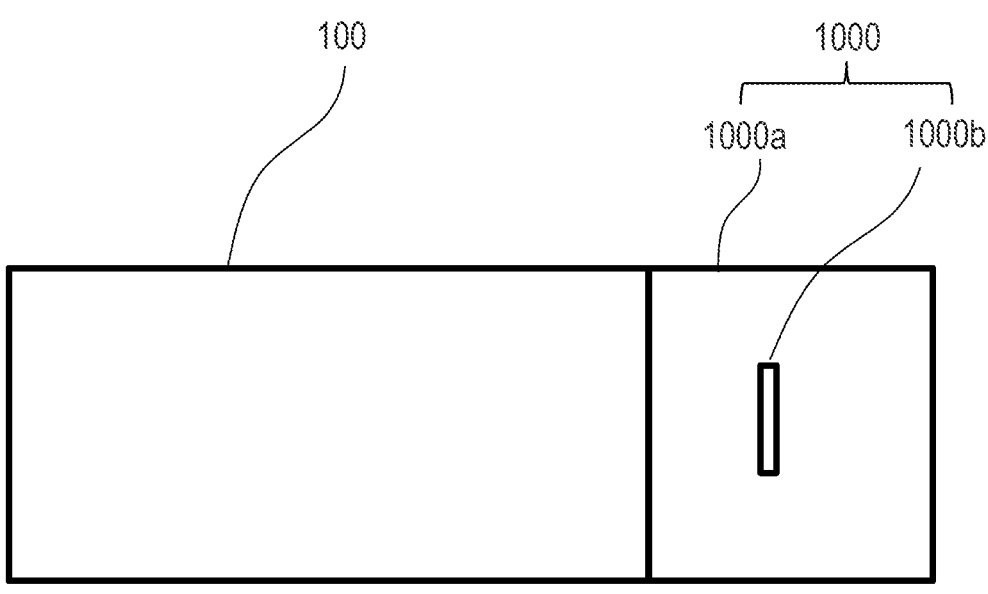
FIG. 6 is a schematic view for illustrating a configuration example of an image pickup apparatus.

FIG. 6 is a schematic view for illustrating a configuration example of an image pickup apparatus including a camera apparatus 1000 using the lens device 100 to which the present invention has been applied. The image pickup apparatus includes the lens device 100 and the camera apparatus 1000. The camera device 1000 includes a camera main body 1000*a* including an image pickup element 1000*b* configured to pick up an image of an object, which is formed through the lens device 100. Further, the image pickup apparatus may be configured so that the lens device 100 is removably mounted to the camera main body 1000*a* of the camera apparatus 1000.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-181633, filed Nov. 14, 2022, which is hereby incorporated by reference herein in its entirety.

What is claimed is:

1. An optical device comprising:
first to fourth lens units;
first to fourth drive units configured to move the first to fourth lens units in a direction along an optical axis, respectively;
a stop member having a variable aperture diameter; and
a fifth drive unit configured to change the aperture diameter,
wherein one of drive units arranged closer to an image than the stop member among the first to fourth drive units, which has the longest length in the direction along the optical axis, and the fifth drive unit are arranged in different ones of four equally divided spaces around the optical axis, and
wherein each of the first to fifth drive units is an actuator.

2. The optical device according to claim 1, further comprising a casing configured to hold the first to fourth lens units, the stop member, and the first to fifth drive units, the casing having a bottom surface, an upper surface, and two side surfaces, the bottom surface and the upper surface being opposed to each other, the two side surfaces being opposed to each other,
wherein the four equally divided spaces around the optical axis are obtained by dividing an internal space around the optical axis by a first plane that contains the optical axis and is orthogonal to the bottom surface and a second plane that contains the optical axis and is orthogonal to the first plane.

3. The optical device according to claim 1, wherein two of the first to fourth drive units arranged in different four equally divided spaces around the optical axis are arranged so as to overlap each other in the direction along the optical axis.

4. The optical device according to claim 1, wherein the first to fourth drive units are arranged in different four equally divided spaces around the optical axis, respectively.

5. The optical device according to claim 1, wherein the fifth drive unit is arranged in the space in which one of the first to fourth drive units is arranged.

6. The optical device according to claim 5,
wherein the first to fourth lens units are arranged in the stated order from an object side to the image side, and
wherein the fourth drive unit is arranged in the space in which the fifth drive unit is arranged.

7. The optical device according to claim 6, wherein the fifth drive unit is arranged closer to the optical axis than the fourth drive unit.

8. The optical device according to claim 1, wherein, when the optical device is in a normal position, the fifth drive unit is arranged in an upper left one of the spaces.

9. The optical device according to claim 1, wherein at least one of the first to fourth drive units includes a stepping motor, and at least another one of the first to fourth drive units includes a voice coil motor.

10. The optical device according to claim 1, wherein the fifth drive unit includes one of a stepping motor or a DC motor.

11. An image pickup apparatus comprising:
an optical device including:
first to fourth lens units;
first to fourth drive units configured to move the first to fourth lens units in a direction along an optical axis, respectively;
a stop member having a variable aperture diameter; and
a fifth drive unit configured to change the aperture diameter,
wherein one of drive units arranged closer to an image than the stop member among the first to fourth drive units, which has the longest length in the direction along the optical axis, and the fifth drive unit are arranged in different ones of four equally divided spaces around the optical axis; and
an image pickup element configured to pick up an image, which is formed through the optical device, and
wherein each of the first to fifth drive units is an actuator.

12. The optical device according to claim 1,
wherein each of the first to fifth drive units are one of a stepping motor, DC motor or voice coil motor.

13. The optical device according to claim 1,
wherein the fifth drive unit is one or a stepping motor or a DC motor,
wherein each of the first, second and fourth drive units are stepping motors, and
wherein the third drive unit is voice coil motor.

14. The image pickup apparatus according to claim 11,
wherein each of the first to fifth drive units are one of a stepping motor, DC motor or voice coil motor.

15. The image pickup apparatus according to claim 11,
wherein the fifth drive unit is one or a stepping motor or a DC motor,
wherein each of the first, second and fourth drive units are stepping motors, and
wherein the third drive unit is voice coil motor.

* * * * *